(12) United States Patent
Tang et al.

(10) Patent No.: US 11,898,212 B1
(45) Date of Patent: Feb. 13, 2024

(54) METHOD AND DEVICE FOR MONITORING BLAST FURNACE STATE BASED ON MULTI-MODES FUSION

(71) Applicant: ZHEJIANG UNIVERSITY, Zhejiang (CN)

(72) Inventors: Xiaoyu Tang, Hangzhou (CN); Xin Wang, Hangzhou (CN); Chunjie Yang, Hangzhou (CN); Wenhai Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/354,602

(22) Filed: Jul. 18, 2023

Related U.S. Application Data

(63) Continuation of application No. PCT/CN2022/070184, filed on Jan. 5, 2022.

(51) Int. Cl.
*C21B 7/24* (2006.01)
*F27B 1/28* (2006.01)
*G05B 19/4155* (2006.01)

(52) U.S. Cl.
CPC .................. *C21B 7/24* (2013.01); *F27B 1/28* (2013.01); *G05B 19/4155* (2013.01); *C21B 2300/04* (2013.01); *G05B 2219/45132* (2013.01)

(58) Field of Classification Search
None
See application file for complete search history.

(56) References Cited

U.S. PATENT DOCUMENTS

2023/0205952 A1\* 6/2023 Wu .................. G06F 18/214
703/1

FOREIGN PATENT DOCUMENTS

| CN | 108334898 A | 7/2018 |
|---|---|---|
| CN | 108460213 A | 8/2018 |
| CN | 110066895 A | 7/2019 |
| CN | 111651931 A | 9/2020 |
| CN | 113234874 A | 8/2021 |
| CN | 113297723 A | 8/2021 |
| JP | 2012172221 A | 9/2012 |

OTHER PUBLICATIONS

International Search Report (PCT/CN2022/070184); dated Sep. 29, 2022.

\* cited by examiner

*Primary Examiner* — Ryan A Jarrett
(74) *Attorney, Agent, or Firm* — W&G Law Group

(57) ABSTRACT

A method and device for blast furnace state monitoring based on multi-modes fusion. In the process of blast furnace state monitoring, the concept of sub-mode is introduced, and the method for pre-acquisition and multi-modes weighted fusion by sub-mode is proposed to monitor blast furnace state. After preprocessing the main parameter data of the blast furnace, several sub-modes of the blast furnace and their corresponding blast furnace state indication variable data are obtained by means of a mean shift clustering algorithm. Taking the real-time parameter data of the blast furnace as inputs, the Euclidean distance between the real-time parameter data of the blast furnace and each sub-mode is calculated, and the sub-modes are weighted and fused according to the distance, and the fusion result is the real-time blast furnace state, so as to realize the real-time state monitoring of the blast furnace in a smooth operation.

6 Claims, 2 Drawing Sheets

METHOD AND DEVICE FOR MONITORING BLAST FURNACE STATE BASED ON MULTI-MODES FUSION

CROSS-REFERENCE TO RELATED APPLICATIONS

The present application is a continuation of International Application No. PCT/CN2022/070184, filed on Jan. 5, 2022, the content of which is incorporated herein by reference in their entirety.

TECHNICAL FIELD

The present disclosure relates to the technical field of blast furnace smelting process monitoring, in particular to a method and device for monitoring blast furnace state based on multi-modes fusion.

BACKGROUND

As a pillar industry of the national economy, steel industry plays an important role in the national economic system. With the acceleration of national modernization, the demand for steel in various countries is increasing year by year, and the output and quality of steel have become an important standard to measure a country's comprehensive national strength.

Blast furnace iron-making process is an important part of iron and steel industry, which mainly uses reducing gas to reduce iron from iron ore at high temperature, and its energy consumption accounts for 70% of the whole production chain. If the operation of the blast furnace fluctuates or fails, it will cause unnecessary waste of energy and decrease of the quality of tapping, or even cause safety accidents. Therefore, for the blast furnace control system, keeping the blast furnace running in a stable and steady state is a necessary condition to ensure the energy-saving, safe and efficient iron-making process. The reliable and real-time blast furnace state monitoring system is the primary component of blast furnace control.

However, the blast furnace is one of the most complicated industrial chemical reaction vessels. When the blast furnace is running, its interior is always in the state of high temperature and high pressure. Because of the harsh and extreme environment inside the blast furnace, it is very difficult to apply detection techniques in it to acquire the measurement directly. In the process of blast furnace operation, solid phase, liquid phase and gas phase coexist, and the transfer of heat, mass and momentum occur at all times. Therefore, it is also very difficult to establish an accurate blast furnace mechanism model. At present, there is no explicit solution for the control process of blast furnace ironmaking in academia and industry.

With the wide application of intelligent sensors in the blast furnace, a large number of parameter data are recorded and saved, and researchers have put forward more and more data-driven methods for blast furnace state monitoring. On the one hand, these methods weaken the dependence of the monitoring process on the knowledge of the internal mechanism of the blast furnace; on the other hand, they establish the relationship between the variables and parameters of the blast furnace state by data mining, and to some extent, it overcomes the difficult problem of complicated mechanism model modeling. However, at present, the data-driven method proposed by researchers is mainly used to solve the problem of monitoring the fault of blast furnace, and it is rarely used to solve the problem of real-time blast furnace stable state monitoring. However, the development of iron-making technology has higher requirements for blast furnace state monitoring. In order to make blast furnace operators grasp the internal state of the blast furnace at all times, it is necessary to monitor the stable state of the blast furnace. On this basis, the blast furnace operators can timely adjust, control and optimize the blast furnace parameters according to the information they have mastered, so as to realize the more stable, efficient, safe and energy-saving operation of the blast furnace.

Therefore, the present disclosure provides a method and a device for monitoring the blast furnace state based on multi-modes fusion, so as to realize real-time state monitoring of the blast furnace in a smooth operation.

SUMMARY

In view of the shortcomings of the existing real-time blast furnace state monitoring methods, the objective of the present disclosure is to provide a method and a device for monitoring the blast furnace state based on multi-modes fusion. According to the present disclosure, the concept of sub-mode is introduced in the process of blast furnace state monitoring. During the stable operation of the blast furnace, its various parameter variable data and state indication variable data fluctuate in their respective certain ranges. With the progress of chemical and physical reactions in the blast furnace and the parameter adjustment of the blast furnace operators, the blast furnace internal state will deviate from the original stable state and eventually reach a new stable state, and the data of various parameter variable and state indication variable of the blast furnace will fluctuate within their new certain ranges. In this method, these different stable states are regarded as sub-modes of the blast furnace state when it running smoothly, and the internal state of the blast furnace switches among these different sub-modes. However, only these sub-modes cannot reflect the transition state of the blast furnace from one sub-mode to another sub-mode. Therefore, based on the sub-modes, the present disclosure further proposes the weighted fusion strategy of sub-modes, and takes the result calculated by weighted fusion of multiple modes as the blast furnace transition state from one sub-mode to another sub-mode, finally realizing the real-time blast furnace state monitoring.

In the present disclosure, firstly, a Mean Shift Clustering Algorithm is applied in a large number of blast furnace characteristic variable data to find out the density distribution law of the blast furnace characteristic variable data. Then, the sub-modes of the blast furnace stable state and the corresponding blast furnace state indication variables data are obtained.

Then, after obtaining the real-time blast furnace characteristic variable data, the real-time characteristic variable data and sub-mode data are used as inputs, and the Euclidean distance between them is calculated. According to the Euclidean distance, the sub-modes are weighted and fused, and the fused result is the real-time blast furnace state, thereby realizing the real-time blast furnace stable state monitoring, and ensuring the stable, efficient, safe and energy-saving operation of the blast furnace.

In order to achieve the above purpose, the present disclosure adopts the following technical solution: a method for monitoring blast furnace state based on multi-modes fusion, including the following steps:

(1) Pre-calculation of blast furnace sub-modes, including:

Data preprocessing: acquiring blast furnace historical parameter variable data and blast furnace state indication variable data, and performing preprocessing of missing values filling and abnormal value elimination; wherein the blast furnace state indication variables include, but are not limited to, the following variables that can reflect the blast furnace state: silicon content in molten iron, sulfur content in molten iron and gas utilization rate. Characteristic variables selection on the basis of grey relation analysis: calculating the grey relation degree value between each blast furnace parameter variable data and blast furnace state indication variable data, and selecting the top N blast furnace parameter variables with the highest relation degree as characteristic variables.

Sub-modes acquisition based on the mean shift clustering algorithm: selecting characteristic variable data from a blast furnace historical parameter variable data set to form a historical characteristic variable data set, and applying the mean shift clustering algorithm in the historical characteristic variable data set to obtain several cluster centers; calculating the Euclidean distance between the samples in the historical characteristic variable data set and each cluster center, respectively selecting a sample point with the smallest Euclidean distance from each cluster center as a blast furnace sub-mode, and constructing a sub-mode characteristic variable data set by all selected sample point data; at the same time, constructing a sub-mode indication variable data set according to the blast furnace state indication variable data at the corresponding time of each sub-mode.

(2) Blast furnace multi-modes fusion, including:

Obtaining real-time blast furnace parameter variable data, and selecting the variable data corresponding to the characteristic variables as input variables.

Calculating the Euclidean distance between input variable data and the characteristic variable data of each sub-mode.

Scaling the Euclidean distance based on exponential function and taking the reciprocal to obtain transformed Euclidean distance.

Arranging the sub-modes according to the corresponding transformed Euclidean distance, and selecting first L sub-modes whose total contribution rate is greater than a set threshold.

Normalizing the transformed Euclidean distance of the selected sub-modes to obtain the corresponding weights, and the corresponding weights of the unselected sub-modes being 0, thus obtaining a weight matrix of the sub-modes.

(3) Monitoring of blast furnace state, including:

Reading the indication variable data corresponding to each sub-mode from the sub-mode indication variable data set, and performing weighted summation according to the weight matrix to obtain an estimated value of each blast furnace state indication variable, so as to realize the real-time blast furnace state monitoring.

Further, the step (1) further includes the following sub-steps:

(1.1) Acquiring blast furnace historical parameter variable data and constructing a data set.

(1.2) Filling in missing values in the data set by the moving average method; wherein the calculation formula is as follows:

$$x(t) = \frac{1}{2k+1}\sum_{j=-k}^{k} x(t+j)$$

where t is a time at which there is a missing value, and k is a number of times of moving averages, and x(t) is a parameter value at t.

(1.3) Detecting abnormal values in the data set by the boxplot method and directly eliminating the detected abnormal values; wherein the formulas for calculating data distribution inner limits $L_1$, $L_2$ and data distribution outer limits $L_3$, $L_4$ by the boxplot method are as follows:

$$L_1 = Q_3 + 1.5(Q_3 - Q_1)$$

$$L_2 = Q_3 - 1.5(Q_3 - Q_1)$$

$$L_3 = Q_3 + 3(Q_3 - Q_1)$$

$$L_4 = Q_3 - 3(Q_3 - Q_1)$$

where $Q_1$ is a lower quartile of data distribution, and $Q_3$ is an upper quartile of data distribution.

(1.4) Obtaining blast furnace state indication variable data and preprocessing, including missing value filling and abnormal value elimination.

(1.5) Calculating the grey relation degree value between each blast furnace parameter variable data and blast furnace state indication variable data, and selecting top N blast furnace parameter variables with the highest grey relation degree as characteristic variables; wherein the calculation formula of the grey relation degree is as follows:

$$\gamma(x_0, x_i) = \frac{1}{n}\sum_{p=1}^{n} \xi_i(t_p)$$

where $$\xi_i(t_p) = \frac{\Delta_{min} + \rho\Delta_{max}}{|x_0(t_p) - x_i(t_p)| + \rho\Delta_{max}}$$

$$\Delta_{min} = \min_i(\min_p|x_0(t_p) - x_i(t_p)|)$$

$$\Delta_{max} = \max_i(\max_p|x_0(t_p) - x_i(t)|)$$

where, $x_0$ is the blast furnace state indication variable data of n samples, $x_i$ is each blast furnace parameter variable of the n samples, i=1, 2, ..., m, m is a total number of blast furnace parameter variables, is a grey relation coefficient between the two variables, $t_p$ is a p-th moment, p=1, 2, ..., n, n is a total number of samples contained in each parameter, p is a resolution coefficient, $\Delta_{min}$ is a two level minimum difference, $\Delta_{max}$ is a two level maximum difference, $x_0(t_p)$ is a blast furnace state indication variable value at $t_p$, and $x_i(t_p)$ is a blast furnace parameter variable value at $t_p$.

(1.6) Selecting characteristic variable data calculated in step (1.5) from the blast furnace historical parameter variable data set to form a characteristic historical variable data set.

(1.7) Applying the mean shift clustering algorithm in the historical characteristic variable data set to obtain a plurality of cluster centers.

(1.7.1) Randomly selecting a sample from the historical characteristic variable data set of the blast furnace as a center point c and constructing a sliding window with a radius R, wherein the radius R is determined according to the distribution of samples.

(1.7.2) Calculating an average distance from other sample points to the center point in the sliding window, and taking the average distance as an offset M, wherein the calculation formula is as follows:

$$M = \frac{1}{w} \sum_{y(t_p) \in S_h} [y(t_p) - c]$$

where w is a number of sample points in the sliding window, y is the historical characteristic variable data of the blast furnace, and $S_h$ is a set of all sample points in the sliding window;

(1.7.3) Updating the position of the center points according to the offset M, wherein the calculation formula is as follows:

$$c^{j+1} = M^l + c^l$$

where l is the number of iterations;

(1.7.4) Repeating steps (1.7.1) to (1.7.3) until the position of the center points does not change.

(1.7.5) If the distance between the center point of a current cluster and a center point of another cluster is less than a set threshold, merging the two clusters into one cluster, otherwise, increasing the number of center points by 1.

(1.7.6) Repeating the steps (1.7.1)-(1.7.5) until all the sample points are traversed, and obtaining a cluster center set of the historical characteristic variable data set of the blast furnace.

(1.8) Calculating the Euclidean distance between the samples in the historical characteristic variable data set and each cluster center, respectively selecting a sample point with a smallest Euclidean distance from each cluster center as the blast furnace sub-mode, and constructing a sub-mode characteristic variable data set by all selected sample point data; at the same time, storing the blast furnace state indication variable data at a corresponding time of each sub-mode, and constructing a sub-mode indication variable data set.

Further, step (2) includes the following sub-steps:

(2.1) Obtaining real-time parameter variable data of the blast furnace, and selecting the data corresponding to the N characteristic variables calculated in step (1.5) as input variables.

(2.2) Calculating the Euclidean distance between input variable data and the characteristic variable data of each sub-mode, and constructing an Euclidean distance matrix $D=(d_1, d_2, \ldots, d_u, \ldots, d_q)$, where $d_u$ is the Euclidean distance between the input variable data and the characteristic variable data of a u-th sub-mode, and $u=1, 2, \ldots, q$, q is a number of the sub-modes obtained in step (1.8).

(2.3) Considering that the smaller the Euclidean distance between the input variable data and the characteristic variable data of a sub-mode, the greater the probability that the blast furnace state corresponding to the input variable data belongs to the sub-mode, and the larger the Euclidean distance, the more the probability that the blast furnace state corresponding to the input variable data belongs to the sub-mode decreases when the same distance is increased, and when the Euclidean distance is too large, the sub-mode should not be fused, otherwise the accuracy of multi-modes fusion will decrease, a weight calculation method based on exponential function and mode contribution rate is proposed; the steps are as follows:

(2.3.1) Scaling the Euclidean distance calculated in step (2.2) based on the exponential function and taking a reciprocal, wherein a calculation formula is as follows:

$$d_{u\_t} = \frac{1}{e^{r \times d_u}}$$

wherein $d_{u\_t}$ is a transformed Euclidean distance between the input variable data and the characteristic variable data of the u-th sub-mode, and r is a scaling coefficient;

(2.3.2) Arranging the sub-modes in an order according to corresponding $d_{u\_t}$ from big to small, and selecting first L sub-modes whose total contribution rate is greater than a set threshold; wherein the calculation formula of the contribution rate $con_u$ of each sub-mode is as follows:

$$con_u = \frac{d_{u\_t}}{\sum_{u=1}^{q} d_{u\_t}}$$

(2.3.3) Normalizing the $d_{u\_t}$ of the selected sub-mode to obtain a corresponding weight $w_u$, and the corresponding weight of the unselected sub-mode being 0, thus obtaining a weight matrix W of the sub-modes;

$$w_u = \frac{d_{u\_t}}{\sum_{u \in U_L} d_{u\_t}}$$

where $U_L$ is a set of selected L sub-modes.

Further, the step (3) includes:

After the blast furnace real-time parameter variable data is input, calculating the weight matrix according to step (2); reading the indication variable data corresponding to each sub-mode from the sub-mode indication variable data set, and performing weighted summation; wherein the calculation formula is as follows:

$$\hat{y}_z = \sum_{u=1}^{q} w_u \times y_z^u$$

where $\hat{y}_z$ is an estimated value of a z-th blast furnace state indication variable, $z=1, 2, \ldots, v$, v is a number of types of the blast furnace state indication variables, and $y_z^u$ is a z-th blast furnace state indication variable value corresponding to the u-th sub-mode.

Obtaining an estimated value of the corresponding real-time state indication variable of the blast furnace after sub-mode fusion, which realizes real-time blast furnace state monitoring.

The present disclosure further provides a device for monitoring blast furnace state based on multi-modes fusion, comprising a memory and one or more processors. The executable code is stored in the memory, and when the processors execute the code, the above blast furnace condition monitoring method based on multi-modes fusion is implemented.

The present disclosure further provides a computer readable storage medium on which a program is stored, wherein the program, when executed by a processor, implements the steps of the above blast furnace state monitoring method based on multi-modes fusion.

The present disclosure has the beneficial effects that the real-time blast furnace state monitoring under the condition of the smooth running has important significance for ensuring the stable, efficient, safe and energy-saving operation of the blast furnace. According to the present disclosure, the sub-mode concept and sub-mode weighted fusion strategy are introduced into the real-time blast furnace state monitoring in a smooth operation, and the density distribution law of the characteristic variable data of the blast furnace is searched by using the mean shift clustering algorithm, so as to obtain a plurality of sub-modes of the blast furnace in a smooth operation. After reading the real-time parameter variable data of the blast furnace, sub-mode weighted fusion is carried out according to the Euclidean distance between the real-time parameter variable data and each sub-mode, and the sub-mode weighted fusion result is the real-time state of the blast furnace, thus realizing the real-time blast furnace state monitoring under the condition of the smooth running. The present disclosure can help blast furnace operators to master the internal state of the blast furnace at all times, and timely adjust the parameters of the blast furnace according to the mastered information, so as to realize the more stable, efficient, safe and energy-saving operation of the blast furnace.

DESCRIPTION OF EMBODIMENTS

The present disclosure will be further explained with reference to the drawings and specific examples.

Figure 1:
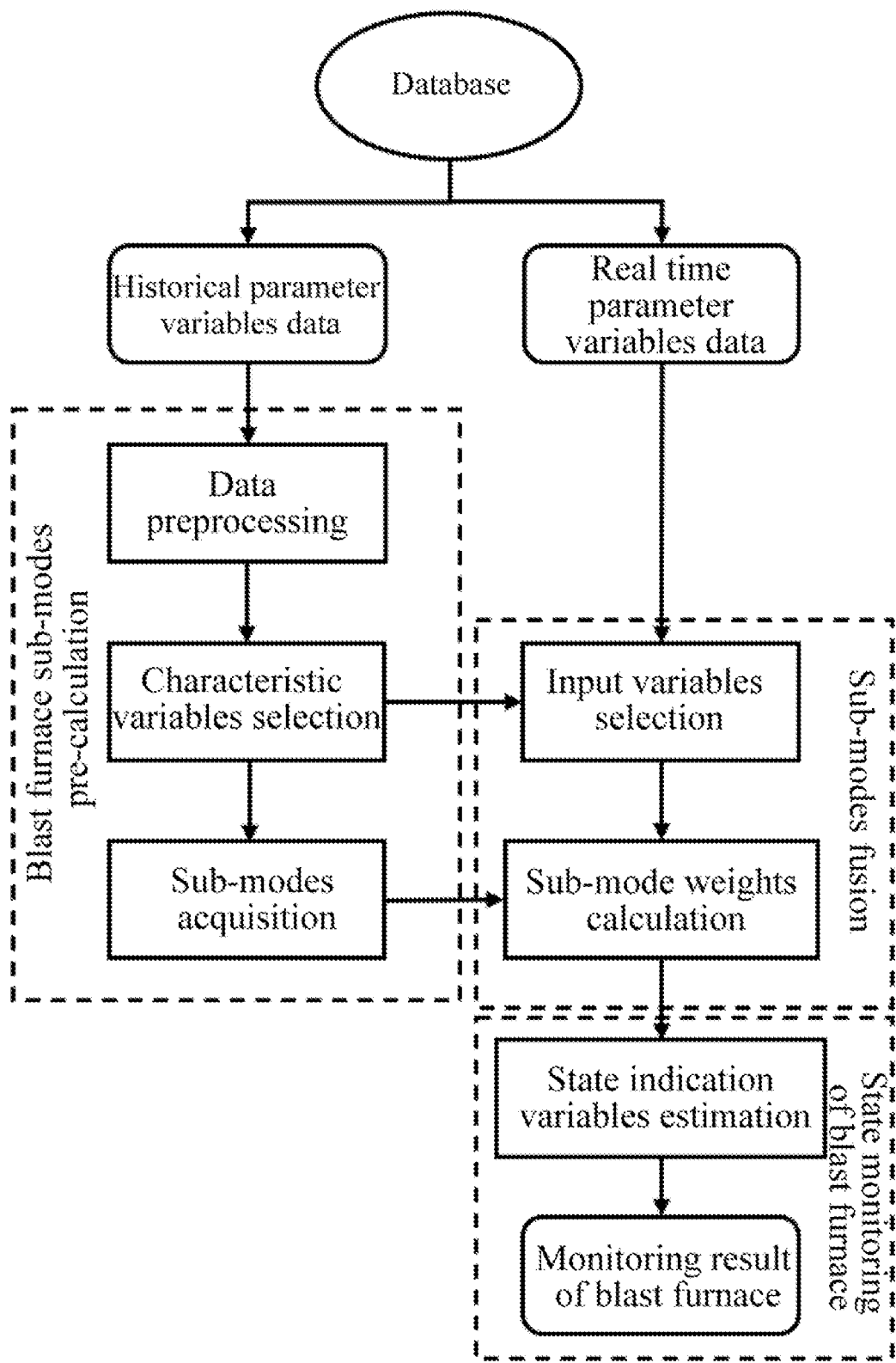
FIG. 1 is a flowchart of a method for monitoring blast furnace state based on multi-modes fusion in the embodiment of the present disclosure.

FIG. 1 shows the overall flow of the blast furnace state monitoring method based on multi-modes fusion in the embodiment of the present disclosure. There are many variables indicating the state of a blast furnace, including silicon content in molten iron, sulfur content in molten iron, gas utilization rate, etc. This application takes silicon content in molten iron as an example for further explanation. Preprocessing the data of the blast furnace historical parameter variable data set includes filling missing values in the data set and eliminating abnormal values; taking the silicon content in molten iron, an blast furnace state indication variable, as the monitoring target, the characteristic variables of various parameters obtained are selected to form a historical characteristic variable data set; the mean shift clustering algorithm is applied in the historical characteristic variable data set to obtain the sub-modes of the stable state of the blast furnace; according to the Euclidean distance between the real-time parameter variable data and each sub-mode, sub-mode weighted fusion is carried out to obtain the real-time blast furnace state.

The embodiment of the present disclosure relates to a blast furnace state monitoring method based on multi-modes fusion, and each step is specifically described as follows:

(1) The concept of sub-mode is introduced in the process of blast furnace state monitoring and the sub-modes of the blast furnace are obtained; the specific steps include:

(1.1) Obtaining historical state parameter variable data and historical operation parameter variable data of a blast furnace; here, a total of 720 groups of blast furnace parameter variable data in a certain year and a month in a 2650 m$^3$ blast furnace database in China are selected here. Specifically:

The historical parameter variable data of the blast furnace include top pressure (kPa), total pressure difference (kPa), permeability index (m gas property (min·kPa)), top temperature southeast (° C.), top temperature southwest (° C.), top temperature northeast (° C.), top temperature northwest (° C.), actual wind speed (m/s), bosh gas index (m bosh (min·m$^2$)), drag coefficient, cold wind flow (10,000 m wind flow), oxygen enrichment flow (m, oxygen enrichment), oxygen enrichment rate (%), blast momentum (kg·m/s), cold wind pressure (Pa), blast humidity (g/m$^3$), pulverized coal injection (ton), theoretical burning temperature (° C.).

(1.2) The missing values of the blast furnace historical parameter variable data are filled. During the operation of the industrial blast furnace, due to the failure or maintenance of sensors, the data in the database is often missing, and the real-time information of the blast furnace is incomplete, which leads to the decrease of the accuracy of its state monitoring. Therefore, it is necessary to fill in the missing data. The moving average method is adopted to fill the missing values in the data set, and the missing value x at time t is calculated by the following formula:

$$x(t) = \frac{1}{2k+1}\sum_{j=-k}^{k} x(t+j)$$

where k is the number of moments of moving averages, which is set to 3 here.

(1.3) The abnormal values of blast furnace historical parameter variable data are eliminated. In the process of industrial blast furnace operation, due to the violent fluctuation in the blast furnace or the blast furnace failure, the observed values of some variables will obviously deviate from the normal range of the variable data in the database, so the data that cannot represent the state of the blast furnace in a smooth operation will be eliminated directly. A boxplot method is used to detect abnormal values in blast furnace data. The boxplot method uses five statistical values of data to describe data distribution, including maximum, minimum, median, upper quartile $Q_3$ and lower quartile $Q_1$. According to these statistical values, two inner limits $L_1$, $L_2$ and two outer limits $L_3$, $L_4$ of data distribution are calculated. Their calculation formulas are as follows:

$L_1=Q_3+1.5(Q_3-Q_1)$ $L_2=Q_3-1.5(Q_3-Q_1)$ $L_3=Q_3+3(Q_3-Q_1)$ $L_4=Q_3-3(Q_3-Q_1)$

When a data is between the inner limit and the outer limit, it is called a mild abnormal value; when a data is outside the outer limit, it is called an extreme abnormal value. Here, both kinds of abnormal values are eliminated.

(1.4) Taking the silicon content (%) in molten iron, an indication variable of direct state of the blast furnace, as the monitoring target of blast furnace state; reading the corresponding data and preprocessing, including filling the missing values in the data set and eliminating the abnormal values; the specific operation method is the same as that described in steps (1.2) and (1.3).

(1.5) The correlation degree between the blast furnace parameter variables read in step (1.1) and the silicon content in molten iron are calculated by using the grey relation analysis method. The state indication variable of the blast furnace, the silicon content in molten iron, is a reference variable, and each parameter variable of the blast furnace is a comparison variable. Then, the grey relation coefficient between the reference variable $x_0$ containing n samples and the comparison variable $x_i$ containing n samples is calculated as follows:

$$\xi_i(t_p) = \frac{\Delta_{min} + \rho \Delta_{max}}{|x_0(t_p) - x_i(t_p)| + \rho \Delta_{max}}$$

where i=1, 2, . . . , m, m is the total number of blast furnace parameter variables; p=1, 2, . . . , n, n is the total number of samples contained in each parameter; $\rho$ is the resolution coefficient, taking 0.5 here; $\Delta_{min}$ is a two level minimum difference, $\Delta_{max}$ is a two level maximum difference. Their calculation formulas are as follows:

$$\Delta_{min} = \min_i(\min_p |x_0(t_p) - x_i(t_p)|)$$

$$\Delta_{max} = \max_i(\max_p |x_0(t_p) - x_i(t)|)$$

The average value of the grey relation coefficient of two variables is the grey relation degree between the two, and the calculation formula is as follows:

$$\gamma(x_0, x_i) = \frac{1}{n} \sum_{p=1}^{n} \xi_i(t_p)$$

m kinds of blast furnace parameter variables are rearranged according to their corresponding grey relation degree values from big to small, and the first N kinds of blast furnace parameter variables with the highest relation degree with the silicon content in molten iron, which is an indication variable of blast furnace state, are selected as the final characteristic variables, where N is set to 7. Some results calculated in this example are shown in the following table:

| Parameters of blast furnace | Grey relation degree |
|---|---|
| Top temperature northeast | 0.7569 |
| Top temperature northwest | 0.7539 |
| Top temperature southeast | 0.7486 |
| Drag coefficient | 0.7428 |
| Top temperature southwest | 0.7416 |
| Gas permeability | 0.7260 |
| Oxygen enrichment rate | 0.7236 |
| Cold wind pressure | 0.7209 |
| Oxygen enrichment flow rate | 0.7190 |
| Pulverized coal injectoin | 0.7186 |
| . . . | . . . |

Therefore, seven characteristic variables are selected: top temperature northeast, top temperature northwest, top temperature southeast, drag coefficient, top temperature southwest, gas permeability and oxygen enrichment rate.

Figure 2:
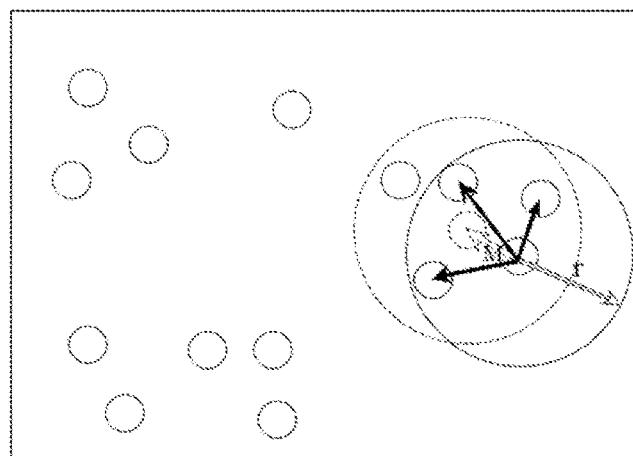
FIG. 2 is an explanatory diagram of the mean shift clustering method in the embodiment of the present disclosure.

(1.6) In the historical characteristic variable data set, a number of blast furnace sub-modes under the condition of smooth operation are obtained by applying the mean shift clustering algorithm. The specific steps include:

FIG. 2 is an explanatory diagram of the mean shift clustering method in the embodiment of the present disclosure.

(1.6.1) Randomly selecting a sample from the historical characteristic variable data set of the blast furnace as a center point c to construct a sliding window with a radius R, wherein the radius R is determined according to the distribution of samples.

(1.6.2) Calculating an average distance from other sample points to the center point in the sliding window, and taking the average distance as an offset M, wherein the calculation formula is as follows:

$$M = \frac{1}{w} \sum_{y(t_p) \in S_h} [y(t_p) - c]$$

where w is a number of sample points in the sliding window, y is the historical characteristic variable data of the blast furnace, and $S_h$ is a set of all sample points in the sliding window.

(1.6.3) Updating a position of the center point according to the offset M; wherein the calculation formula is as follows:

$$c^{j+1} = M^l + c^l$$

where l is the number of iterations;

(1.6.4) Repeating steps (1.6.1) to (1.6.3) until the position of the center point does not change.

(1.6.5) If the distance between the center point of a current cluster and a center point of another cluster is less than a set threshold, merging the two clusters into one cluster, otherwise, increasing the number of center points by 1.

(1.6.6) Repeating steps (1.6.1) to (1.6.5) until all the sample points are traversed, and obtaining a cluster center set of the historical characteristic variable data set of the blast furnace.

(1.7) In this embodiment, a total of 24 sub-modalities are obtained, the Euclidean distance between the samples in the historical characteristic variable data set and each cluster center is calculated, and the sample points with the smallest Euclidean distance from each cluster center are selected as the sub-modes of the blast furnace, and all the selected sample point data are used to construct a sub-mode characteristic variable data set; at the same time, the data of blast furnace state indication variables at the corresponding time of each sub-mode are stored, and a sub-mode indication variable data set is constructed.

(2) In the process of blast furnace state monitoring, a sub-mode weighted fusion strategy is introduced and the weights of sub-modes are calculated. The specific steps include:

(2.1) Reading the real-time parameter variable data of the blast furnace, and selecting the seven characteristic variables selected in step (1.5), including: top temperature northeast, top temperature northwest, top temperature southeast, drag coefficient, top temperature southwest, gas permeability and oxygen enrichment rate, and forming the input variable data $y_c$ of the model.

(2.2) Calculating the Euclidean distance between the input variable data and the characteristic variable data of each sub-mode, and constructing an Euclidean distance matrix $D=(d_1, d_2, \ldots, d_u, \ldots, d_q)$, where $d_u$ is the Euclidean distance between the input variable data and the characteristic variable data of the u-th sub-mode, $u=1, 2, \ldots, q$, q is the number of sub-modes obtained in step (1.7), and in this embodiment, q is 24.

(2.3) Calculating the weight of each sub-mode based on the Euclidean distance between the input variable data and each sub-mode; the specific steps are as follows:

(2.3.1) Scaling the Euclidean distance calculated in step (2.2) based on the exponential function and taking a reciprocal, wherein a calculation formula is as follows:

$$d_{u\_t} = \frac{1}{e^{r \times d_u}}$$

where $d_{u\_t}$ is a transformed Euclidean distance between the input variable data and the characteristic variable data of the u-th sub-mode, and r is a scaling coefficient;

(2.3.2) Arranging the sub-modes in an order according to corresponding $d_{u\_t}$ from big to small, and selecting first L sub-modes whose total contribution rate is greater than a set threshold; wherein the calculation formula of the contribution rate $con_u$ of each sub-mode is as follows:

$$con_u = \frac{d_{u\_t}}{\sum_{u=1}^{q} d_{u\_t}}$$

(2.3.3) Normalizing the $d_{u\_t}$ of the selected sub-mode to obtain a corresponding weight $w_u$, and the corresponding weight of the unselected sub-mode being 0, thus obtaining a weight matrix W of the sub-modes;

$$w_u = \frac{d_{u\_t}}{\sum_{u \in U_L} d_{u\_t}}$$

where $U_L$ is a set of selected L sub-modes.

Part of the results of sub-mode weights calculated in this embodiment is shown in the following table:

|  | Moment 1 | Moment 2 | Moment 3 | Moment 4 | Moment 5 | Moment 6 | Moment 7 | Moment 8 | Moment 9 | Moment 10 | ... |
|---|---|---|---|---|---|---|---|---|---|---|---|
| Sub-mode 1 | 0 | 0 | 0 | 0 | 0 | 0 | 0 | 0 | 0 | 0 | ... |
| Sub-mode 2 | 0 | 0 | 0 | 0 | 0 | 0 | 0 | 0 | 0 | 0 | ... |
| Sub-mode 3 | 0 | 0 | 0.407 | 0.128 | 0 | 0 | 0 | 0 | 0 | 0 | ... |
| Sub-mode 4 | 0 | 0 | 0 | 0 | 0 | 0 | 0 | 0 | 0 | 0 | ... |
| Sub-mode 5 | 0 | 0.624 | 0.539 | 0.872 | 1 | 1 | 0.118 | 0.129 | 0.782 | 0 | ... |
| Sub-mode 6 | 0 | 0 | 0 | 0 | 0 | 0 | 0 | 0 | 0 | 0 | ... |
| Sub-mode 7 | 0 | 0 | 0 | 0 | 0 | 0 | 0 | 0 | 0 | 0 | ... |
| Sub-mode 8 | 0 | 0 | 0 | 0 | 0 | 0 | 0 | 0 | 0 | 0 | ... |
| Sub-mode 9 | 0.063 | 0 | 0 | 0 | 0 | 0 | 0.334 | 0.383 | 0.219 | 0.356 | ... |
| Sub-mode 10 | 0 | 0 | 0 | 0 | 0 | 0 | 0 | 0 | 0 | 0 | ... |
| Sub-mode 11 | 0.071 | 0 | 0 | 0 | 0 | 0 | 0.183 | 0.169 | 0 | 0.201 | ... |
| Sub-mode 12 | 0 | 0 | 0 | 0 | 0 | 0 | 0 | 0 | 0 | 0 | ... |
| Sub-mode 13 | 0.868 | 0.271 | 0 | 0 | 0 | 0 | 0 | 0 | 0 | 0 | ... |
| Sub-mode 14 | 0 | 0 | 0 | 0 | 0 | 0 | 0 | 0 | 0 | 0 | ... |
| Sub-mode 15 | 0 | 0 | 0 | 0 | 0 | 0 | 0 | 0 | 0 | 0 | ... |
| Sub-mode 16 | 0 | 0 | 0 | 0 | 0 | 0 | 0 | 0 | 0 | 0 | ... |
| Sub-mode 17 | 0 | 0 | 0 | 0 | 0 | 0 | 0.365 | 0.318 | 0 | 0.443 | ... |
| Sub-mode 18 | 0 | 0 | 0 | 0 | 0 | 0 | 0 | 0 | 0 | 0 | ... |
| Sub-mode 19 | 0 | 0 | 0 | 0 | 0 | 0 | 0 | 0 | 0 | 0 | ... |
| Sub-mode 20 | 0 | 0 | 0 | 0 | 0 | 0 | 0 | 0 | 0 | 0 | ... |

-continued

|  | Moment 1 | Moment 2 | Moment 3 | Moment 4 | Moment 5 | Moment 6 | Moment 7 | Moment 8 | Moment 9 | Moment 10 | |
|---|---|---|---|---|---|---|---|---|---|---|---|
| Sub-mode 21 | 0 | 0 | 0.054 | 0 | 0 | 0 | 0 | 0 | 0 | 0 | ... |
| Sub-mode 22 | 0 | 0 | 0 | 0 | 0 | 0 | 0 | 0 | 0 | 0 | ... |
| Sub-mode 23 | 0 | 0 | 0 | 0 | 0 | 0 | 0 | 0 | 0 | 0 | ... |
| Sub-mode 24 | 0 | 0.106 | 0 | 0 | 0 | 0 | 0 | 0 | 0 | 0 | ... |

(3) The state monitoring of the blast furnace is realized based on the sub-mode weight calculation results, and the specific steps include:

After the real-time parameter variable data of the blast furnace is input, the weight matrix is calculated according to step (2), and the silicon content data in molten iron corresponding to each sub-mode is read from the sub-mode silicon content data set, and the weighted sum is carried out. The calculation formula is as follows:

$$\hat{y}_{Si} = \sum_{u=1}^{q} w_u \times y_{S_i}^u$$

where $\hat{y}_{Si}$ is the estimated value of silicon content in molten iron, and $y_{Si}^u$ is the value of silicon content in molten iron corresponding to the u-th sub-mode. Therefore, the estimated value of silicon content in blast furnace molten iron after sub-mode fusion is obtained.

In this embodiment, 720 sets of blast furnace parameter variable data from the blast furnace database in another month of the same year are selected to test the model.

Two statistical indicators, Mean Absolute Percentage Error (MAPE) and Root Mean Square Error (RMSE), are used to evaluate the estimation effect of the model. Their calculation formulas are as follows:

$$RMSE = \sqrt{\frac{1}{n}\sum_{p=1}^{n}[s(t_p) - \overline{s(t_p)}]^2}$$

$$MAPE = \frac{1}{n}\sum_{p=1}^{n}\left|\frac{\overline{s(t_p)} - s(t_p)}{s(t_p)}\right| \times 100\%$$

where $s(t_p)$ and $\overline{s(t_p)}$ are the real and estimated values of the data, respectively.

Figure 3:
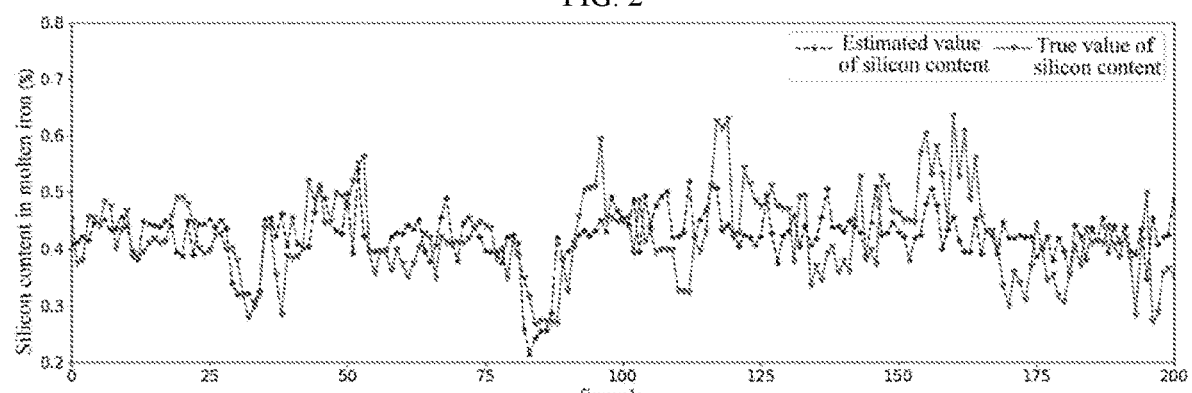
FIG. 3 is an estimation result diagram of silicon content in molten iron when the method in the embodiment of the present disclosure is applied to the data of a blast furnace.

As shown in FIG. 3, because there are too many data samples, only the test results of the first 200 samples are selected for display. The dotted line shows the estimated value of silicon content in molten iron based on multi-modes fusion, and the solid line shows the actual value of silicon content in molten iron. As shown in the figure, the change trends of the solid line and the dotted line are roughly the same, and the fitting effect is ideal, which proves the effectiveness and applicability of the method provided by the present disclosure. In addition, RMSE and MAPE of the estimated silicon content based on multi-modes fusion are 0.0803 and 14.99% respectively, which more intuitively proves the effectiveness and applicability of the proposed method.

Corresponding to the embodiment of the blast furnace state monitoring method based on multi-modes fusion, the present disclosure also provides an embodiment of the device for monitoring blast furnace state based on multi-modes fusion.

Figure 4:
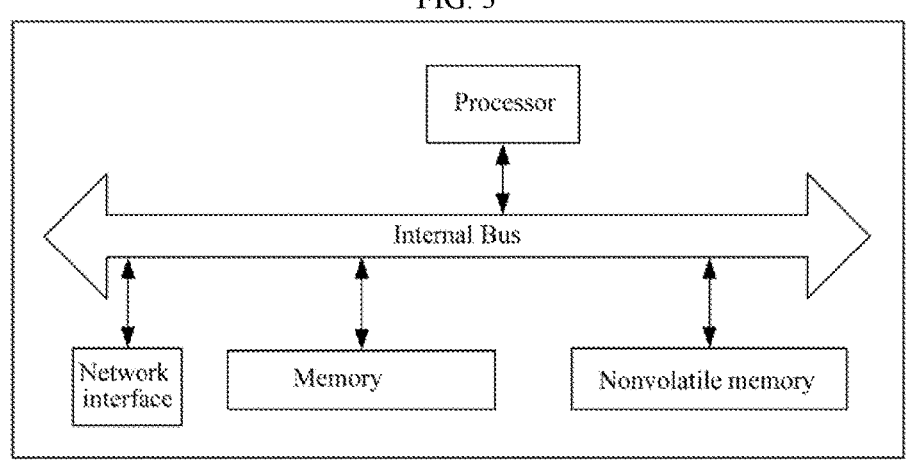
FIG. 4 is a structural diagram of a device for monitoring blast furnace state based on multi-modes fusion in the embodiment of the present disclosure.

Referring to FIG. 4, a device for monitoring blast furnace state based on multi-modes fusion provided by an embodiment of the present disclosure includes a memory and one or more processors. The executable code is stored in the memory, and when the processors execute the code, the above blast furnace condition monitoring method based on multi-modes fusion is implemented.

The embodiment of the device for monitoring blast furnace state based on multi-modes fusion can be applied to any equipment with data processing capability, and any equipment with data processing capability can be equipment or devices such as computers. The embodiment of the device can be realized by software, or by hardware or a combination of hardware and software. Take the software implementation as an example, as a logical device, it is formed by reading the corresponding computer program instructions in the nonvolatile memory into the memory through the processor of any device with data processing capability. From the aspect of hardware, as shown in FIG. 4, it is a hardware structure diagram of any equipment with data processing capability in the device monitoring blast furnace state based on multi-modes fusion according to the present disclosure. Except the processor, memory, network interface and non-volatile memory shown in FIG. 4, any equipment with data processing capability in the embodiment of the present disclosure can usually include other hardware according to the actual functions of the equipment with data processing capability, which will not be repeated here.

The realization process of the functions and functions of each unit in the above-mentioned device is detailed in the realization process of the corresponding steps in the above-mentioned method, which will not be repeated here.

An embodiment of the present disclosure also provides a computer readable storage medium on which a program is stored. When the program is executed by a processor, it implements the blast furnace state monitoring based on multi-modes fusion in the above embodiment.

It should be noted that the above embodiments are only used to illustrate, rather than to limit the technical solution of the present disclosure. Although the present disclosure has been described in detail with reference to the preferred embodiments, those skilled in the art should understand that the technical solution of the present disclosure can be modified or equivalently replaced without departing from the spirit and scope of the technical solution of the present disclosure, which should be covered by the claims of the present disclosure. The above specific embodiments have explained the technical solution and beneficial effects of the present disclosure in detail. It should be understood that the above embodiments are only the most preferred embodiments of the present disclosure, and are not intended to limit the present disclosure. Any modification, supplement, equivalent substitution and the like made within the scope of the principles of the present disclosure shall be included in the scope of protection of the present disclosure.

What is claimed is:

1. A method for monitoring blast furnace state based on multi-modes fusion, comprising:

step (1) pre-calculation of sub-modes of blast furnace, comprising:

step (1.1) acquiring blast furnace historical parameter variable data and constructing a data set;

step (1.2) filling in missing values in the data set by a moving average method;

step (1.3) detecting abnormal values in the data set by a boxplot method and directly eliminating the detected abnormal values;

step (1.4) obtaining blast furnace state indication variable data and preprocessing, comprising filling the missing values and eliminating the abnormal values;

step (1.5) calculating a grey relation degree value between each blast furnace parameter variable data and blast furnace state indication variable data, and selecting top N blast furnace parameter variables with the highest correlation as characteristic variables; wherein a calculation formula of the grey relation degree is as follows:

$$\gamma(x_0, x_i) = \frac{1}{n}\sum_{p=1}^{n}\xi_i(t_p)$$

where $$\xi_i(t_p) = \frac{\Delta_{min} + \rho\Delta_{max}}{|x_0(t_p) - x_i(t_p)| + \rho\Delta_{max}}$$

$$\Delta_{min} = \min_{i}(\min_{p}|x_0(t_p) - x_i(t_p)|)$$

$$\Delta_{max} = \max_{i}(\max_{p}|x_0(t_p) - x_i(t_p)|)$$

where $x_0$ is the blast furnace state indication variable data of n samples, $x_i$ is each blast furnace parameter variable of the n samples, $i=1, 2, \ldots, m$, m is a total number of blast furnace parameter variables, $\xi$ is a grey relation coefficient between the two variables, $t_p$ is a p-th moment, $p=1, 2, \ldots, n$, n is a total number of samples contained in each parameter variable, $\rho$ is a resolution coefficient, $\Delta_{min}$ is a two level minimum difference, $\Delta_{max}$ is a two level maximum difference, $x_0(t_p)$ is a blast furnace state indication variable value at $t_p$ and $x_i(t_p)$ is a blast furnace parameter value at $t_p$;

step (1.6) selecting characteristic variable data calculated in step (1.5) from the blast furnace historical parameter variable data set to form a historical characteristic variable data set;

step (1.7) applying a mean shift clustering algorithm in the historical characteristic variable data set to obtain a plurality of cluster centers; and step (1.8) calculating the Euclidean distance between the samples in the historical characteristic variable data set and each cluster center, selecting a sample point with a smallest Euclidean distance from each cluster center as the sub-modes of the blast furnace, respectively, and constructing a sub-mode characteristic variable data set by all selected sample point data, storing the blast furnace state indication variable data at a corresponding time of each sub-mode, and constructing a sub-mode indication variable data set;

step (2) blast furnace sub-mode fusion, comprising:

step (2.1) obtaining real-time parameter variable data of the blast furnace, and selecting the data corresponding to the N characteristic variables calculated in step (1.5) as input variables;

step (2.2) calculating the Euclidean distance between input variable data and the characteristic variable data of each sub-mode, and constructing an Euclidean distance matrix $D=(d_1, d_2, \ldots, d_u, \ldots, d_q)$, where $d_u$ is the Euclidean distance between the input variable data and the characteristic variable data of a u-th sub-mode, and $u=1, 2, \ldots, q$, q is a number of types of the sub-modes obtained in step (1.8);

step (2.3) calculating a weight on the basis of an exponential function and a sub-mode contribution rate, comprising:

step (2.3.1) scaling the Euclidean distance calculated in step (2.2) based on the exponential function and taking a reciprocal, wherein a calculation formula is as follows:

$$d_{u\_t} = \frac{1}{e^{r \times d_u}}$$

where $d_{u\_t}$ is a transformed Euclidean distance between the input variable data and the characteristic variable data of the u-th sub-mode, and r is a scaling coefficient;

step (2.3.2) arranging the sub-modes in an order according to corresponding $d_{u\_t}$ from big to small, and selecting first L sub-modes whose total contribution rate is greater than a set threshold; wherein the calculation formula of the contribution rate $con_u$ of each sub-mode is as follows:

$$con_u = \frac{d_{u\_t}}{\sum_{u=1}^{q} d_{u\_t}}$$

step (2.3.3) normalizing the $d_{u\_t}$ of the selected sub-mode to obtain a corresponding weight $w_u$, the corresponding weight of the unselected sub-mode being 0, and obtaining a weight matrix W of the sub-modes;

step (3) monitoring of blast furnace state, comprising:

reading the indication variable data corresponding to each sub-mode from the sub-mode indication variable data set, and performing weighted summation; wherein the calculation formula is as follows:

$$\hat{y}_z = \sum_{u=1}^{q} w_u \times y_z^u$$

where $\hat{y}_z$ is an estimated value of a z-th blast furnace state indication variable, $z=1, 2, \ldots, v$, v is a number of types of the blast furnace state indication variables, and $y_z^u$ is a z-th blast furnace state indication variable value corresponding to the u-th sub-mode; and obtaining an estimated value of the corresponding real-time state indication variable of the blast furnace after sub-mode fusion, which realizes real-time state monitoring of the blast furnace.

2. The method according to claim 1, wherein the calculation formula of filling missing values in step (1.2) is as follows:

$$x(t) = \frac{1}{2k+1}\sum_{j=-k}^{k} x(t+j)$$

where t is a time at which there is a missing value, and k is a number of times of moving averages, and x(t) is a parameter value at t.

3. The method according to claim 1, wherein, in step (1.3), the formulas for calculating data distribution inner limits $L_1$, $L_2$ and data distribution outer limits $L_3$, $L_4$ by the boxplot method are as follows:

$L_1 = Q_3 + 1.5(Q_3 - Q_1)$ $L_2 = Q_3 - 1.5(Q_3 - Q_1)$ $L_3 = Q_3 + 3(Q_3 - Q_1)$ $L_4 = Q_3 - 3(Q_3 - Q_1)$ where $Q_1$ is a lower quartile of data distribution, and $Q_3$ is an upper quartile of data distribution.

4. The method according to claim 1, wherein in the step (1.7), said applying a mean shift clustering algorithm in the historical characteristic variable data set to obtain a plurality of cluster centers comprises:

step (1.7.1) randomly selecting a sample from the historical characteristic variable data set of the blast furnace as a center point c to construct a sliding window;

step (1.7.2) calculating an average distance from other sample points to the center point in the sliding window, and taking the average distance as an offset M, wherein the calculation formula is as follows:

$$M = \frac{1}{w} \sum_{y(t_p) \in S_h} [y(t_p) - c]$$

where w is a number of sample points in the sliding window, y is the historical characteristic variable data of the blast furnace, and $S_h$ is a set of all sample points in the sliding window;

step (1.7.3) updating a position of the center point according to the offset M;

step (1.7.4) repeating steps (1.7.1) to (1.7.3) until the position of the center point does not change;

step (1.7.5) when the distance between the center point of a current cluster and a center point of another cluster is less than a set threshold, merging the two clusters into one cluster, and when the distance between the center point of a current cluster and a center point of another cluster is greater or equal to than a set threshold, increasing the number of center points by 1; and step (1.7.6) repeating the steps (1.7.1) to (1.7.5) until all the sample points are traversed, and obtaining a cluster center set of the historical characteristic variable data set of the blast furnace.

5. A device for monitoring blast furnace state based on multi-modes fusion, comprising a memory and one or more processors, wherein executable codes are stored in the memory, and wherein when the processor executes the executable codes, the device is configured to implement the blast furnace state monitoring method based on multi-modes fusion according to claim 1.

6. A non-transitory computer readable storage medium on which a program is stored, wherein the program, when executed by a processor, implements the blast furnace state monitoring method based on multi-modes fusion according to claim 1.

* * * * *